Figure 3:
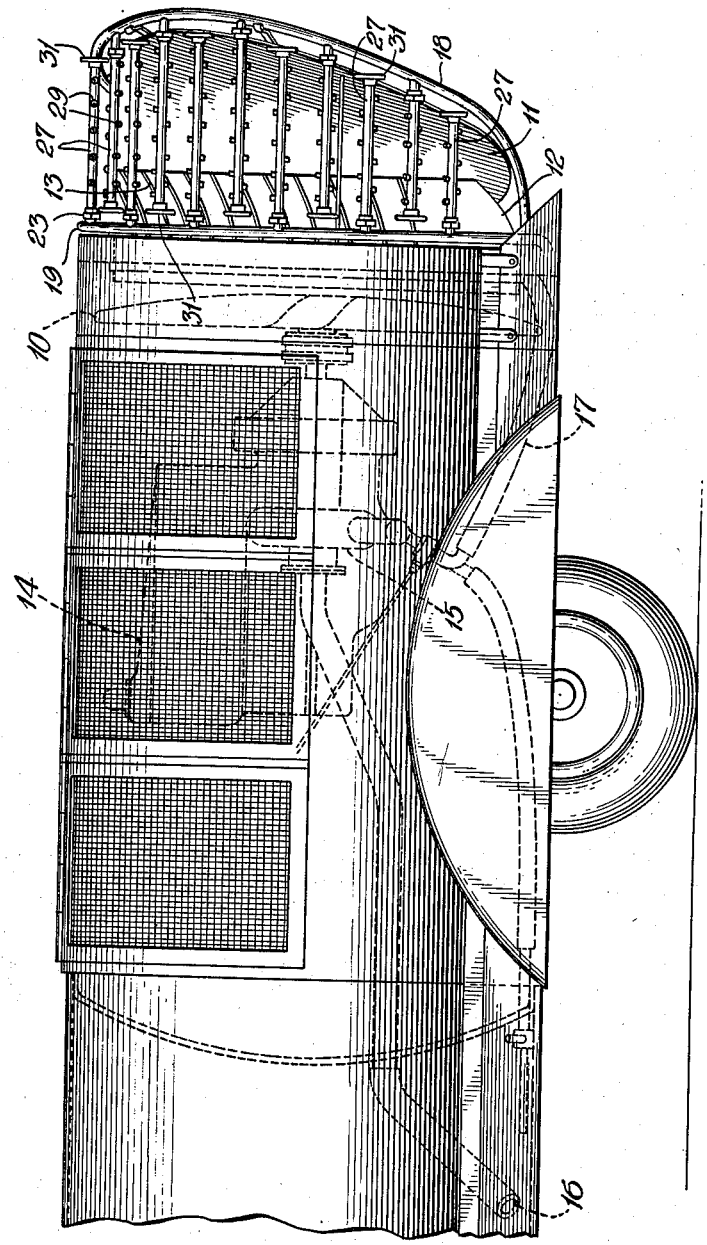

April 10, 1951     G. W. DAUGHERTY     2,547,927
SPRAYING MACHINE
Filed June 20, 1946
2 Sheets-Sheet 1
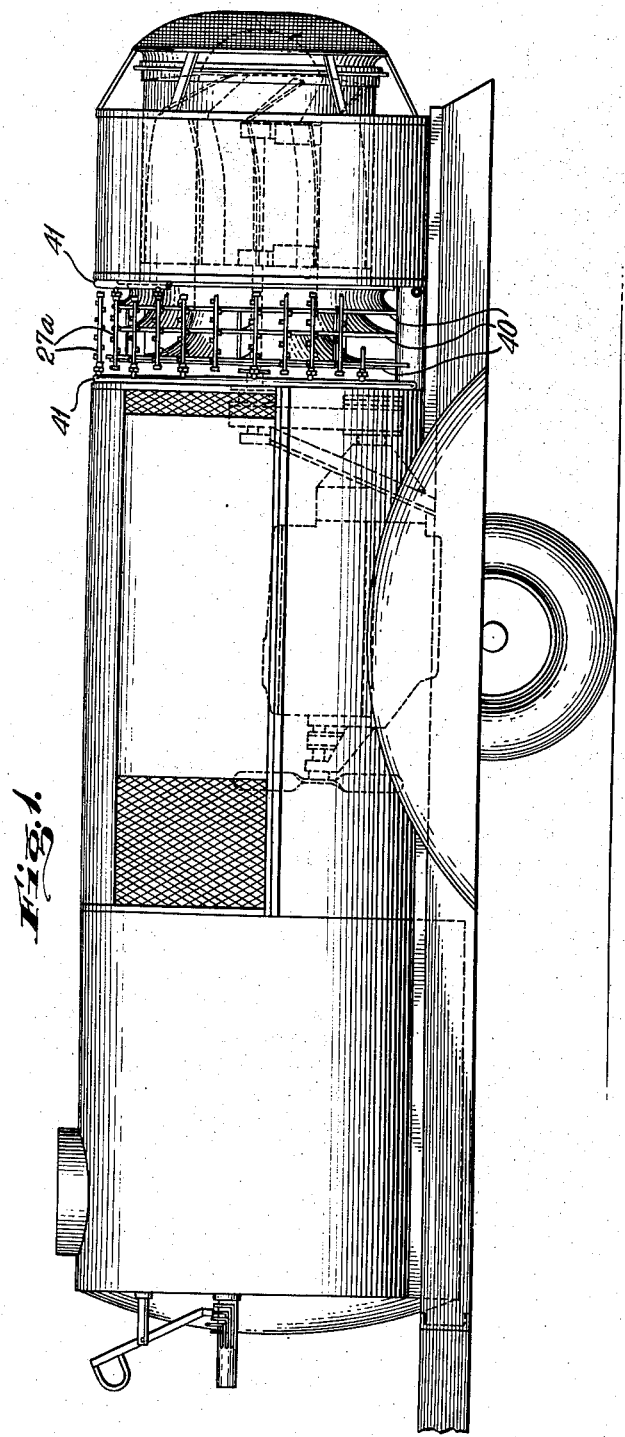
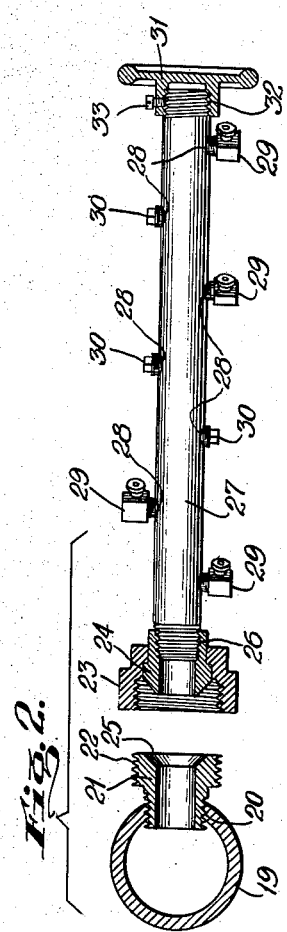
INVENTOR
G. W. Daugherty
BY
A. H. Golden
ATTORNEY Patented Apr. 10, 1951

2,547,927

UNITED STATES PATENT OFFICE 2,547,927

SPRAYING MACHINE

George W. Daugherty, Orlando, Fla., assignor to Food Machinery and Chemical Corporation, San Jose, Calif., a corporation of Delaware Application June 20, 1946, Serial No. 678,092

2 Claims. (Cl. 261—29)

This invention relates to a spraying machine of the type adapted for movement through an orchard or orange grove for covering the trees thereof with suitable spraying material. More particularly, this invention relates to a machine of the type disclosed in several of my earlier patents and more especially my Patent No. 2,358,318 dated September 19, 1944 and Patent No. 2,476,960 dated July 26, 1949.

In machines of the class described, a considerable volume of air is generated and is directed outwardly through an air tunnel that may be of short or considerable length, direction being imparted to the air by suitable deflectors. In the patent to which I have herein referred specifically, a series of pipes bearing spraying material is placed in the path of the air as directed by the deflectors, and spraying material is supplied to these pipes. Nozzles are set into the pipes and the spraying material is adapted to leave the nozzles and to be picked up by the blast of air moving under the guidance of the deflector system.

A feature of the invention of this application embodies the conception of means for changing readily the number of nozzles that will feed spraying material into the blast of air. A further feature of this part of the invention resides in the conception of means whereby only those nozzles in particular locations receive spraying material that is adapted to be picked up by the blast of air.

A still further feature of my invention resides in the arrangement of means whereby the directional flow of spraying material from the several nozzles is predetermined so that the movement of the spraying material relatively to the blast of air may be controlled for a predetermined distance. It is a particular feature of my invention that I have been able to contribute extremely simple structures whereby the three conceptions set forth are reduced to practice, rather than the complex and expensive means that would normally first occur to those skilled in the art.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims to be granted me shall be of sufficient breadth to prevent the appropriation of my invention by those skilled in the art.

Referring now to the drawings, Fig. 1 is an elevation of a machine of the class set forth in my earlier application identified above, with my invention shown embodied therein. Fig. 2 is an exploded view showing one of the pipes through which my spraying material is fed, together with the nozzles and plugs fitted thereto. Fig. 3 shows an elevation of part of the machine of my patent supra to which my invention has been applied.

Referring now more particularly to the drawings, and especially Fig. 3, there is illustrated there the spraying machine of my patent in which a propeller 10 generates a large blast of air that is deflected to one side by an end deflector 11 under the control of suitable vertical deflectors 12 and elevator deflectors 13. The propeller 10 is rotated by an internal combustion engine 14 and this same engine operates a pump 15 that transmits fluid from a tank at 16 through suitable flexible pipes, one of which is designated by reference numeral 17. These pipes 17 supply fluid to a supporting pipe line 18 at the outer end of the deflector system and a second supporting pipe line 19 juxtaposed to the end of the tunnel and at the beginning of the deflector system. The structure so far described is the same as that shown in my earlier patent.

Referring now to Fig. 2 as well as to Fig. 3, I show in section the supporting pipe line 19 threaded at 20 for supporting a nipple 21 in turn threaded at 22 for a coupling nut 23. The coupling nut 23 is adapted to engage the threads 22 of the nipple 21 and to force a fitting 24 against the seat 25 of the nipple whereby to form a fluid tight joint. The fitting 24 is threaded at 26 for a feed pipe 27. Feed pipe 27 is in turn threaded at several places designated by reference numeral 28. As is well seen in Fig. 2, nozzles 29 are secured in four of the threaded openings 28 while solid plugs 30 are secured in three of the threaded openings 28. The end of the feed pipe 27 is closed by a hand wheel 31 threaded onto the pipe 27 at 32 and held against release by a fastening stud 33.

It is now obvious that spraying material will move through the supporting pipe line 19 and into each of the several feed pipes 27. As shown in Fig. 3, there are six such feed pipes secured to the supporting pipe line 19 and five secured to the supporting pipe line 18. Actually, there may be any number of such pipes arranged as may be required by particular conditions. The spraying material will issue from each feed pipe 27 through the several nozzles 29 secured thereto. It is now quite obvious that I may secure but one nozzle 29 or six nozzles 29 or even more nozzles to each of the pipes 27. Also, these nozzles may be in any particular position with relation to the air stream that is desired. Moreover, it is possible to remove a nozzle very rapidly and to replace that nozzle with a plug 30 so that the location of the nozzles and their number may be controlled readily and with great ease. This is an extremely important feature of a machine of this class and the concept on which the very simple structure is based was one that eluded me until the present invention was made.

It is very desirable that the spray be fed into the air stream in a particular direction, and with sufficient force so that direction will be imparted to the spray relatively to the blast of air until picked up by the blast of air. In order to accomplish this, the pump 15 must be suitably and conventionally controlled to vary the pressure generated thereby, but it is necessary to control also the positioning of the nozzles 29 with regard to the direction of discharge thereby. For the particular reason, each of the feed pipes 27 is equipped with the hand wheel 31 so that upon a slight loosening of the coupling nut 23 each feed pipe may be rotated to a desired position. Thereafter, a tightening of the coupling nut 23 will hold the feed pipes and the nozzles thereon in predetermined directional positions. In this manner, the direction of the feed of the spraying material into the air blast is correctly and easily predetermined.

In Fig. 1, I show the machine of my application supra in which the blast of air is generated and then directed by three air guides 40. Extending about the circle defined by the air guides 40 is a pair of supporting pipe lines 41. Secured to these pipe lines 41 in the same manner as in the modification of Fig. 3 is a series of feed pipes designated by reference numeral 27a. It is, of course, obvious that in the modification of Fig. 1 the positioning of the nozzles, the varying of the number of the nozzles, and the rotated positioning of the nozzles is readily accomplished as already set forth. I believe that the considerable utility and value of my invention will now be quite apparent to those skilled in the art.

I now claim:

1. In a spraying machine of the class described, an air tunnel, means for developing a blast of air through said tunnel, air guide means at the end of said tunnel for deflecting the blast of air radially of the axis of said tunnel, a series of spray distributing pipes spaced about the air-guide means and parallel with the axis of the tunnel, spray nozzles spaced along said pipes, threaded means at the end of each pipe for securing and clamping said pipe in angularly adjusted position whereby to control the direction of spray material issuing from said nozzles into said air blast, and means for feeding spray material to said pipes and therefore to said nozzles, said spray feeding means forcing said material from said nozzles under sufficient pressure so that said spray moves as directed by said nozzles into said blast of air prior to flowing with said blast of air.

2. In the combination of claim 1, the said pipes having a plurality of threaded openings, said spray nozzles being threaded into certain of said openings, and plugs threaded into others of said openings.

GEORGE W. DAUGHERTY.

REFERENCES CITED

The following references are of record in the file of this patent:

UNITED STATES PATENTS

| Number | Name | Date |
| --- | --- | --- |
| 1,287,578 | Dorris | Dec. 10, 1918 |
| 2,070,665 | Lepper | Feb. 16, 1937 |
| 2,358,318 | Daugherty | Sept. 19, 1944 |